Patented Dec. 26, 1944

2,365,788

UNITED STATES PATENT OFFICE 2,365,788

PRODUCTION OF SIRUP FROM FARINACEOUS MATERIALS

Christopher Henry Warburton, Carlisle, England

No Drawing. Application March 27, 1942, Serial No. 436,534. In Great Britain April 5, 1941

9 Claims. (Cl. 99—142)

The present invention relates to improvements in the production of sirup from farinaceous material for example from starches or from wheat flour.

In the usual process for the production of high strength edible malt sirup from starch it has been customary to convert the starch by a diastatic enzyme and then to concentrate the product by evaporation.

It would be desirable to produce a high strength sirup without evaporation but if attempts are made to treat a swollen starch paste containing, for example, 70% by weight of starch, the viscosity of this paste would be so high that the material could not be readily handled. It would be difficult to effect satisfactory treatment with malt and hydration would be only partial.

The present invention consists primarily in producing a sweet sirup by adding an excess of farinaceous material to water, at the same time gelatinising the starch by heat and liquefying sufficient of the gelatinised starch by an enzymic liquefier so that the mass is reduced to a sirupy consistency, and then converting the mass at a lower temperature by action of added enzyme to a sweet sirup containing over 50% of reducing sugar and dextrin and over 65% total solids without a separate evaporation process. Usually 1⅓ and preferably 2 to 2½ parts of farinaceous material are used for 1 part by weight of water (taking starch as containing 10% water and wheat flour 15%): if the percentage of water differs the above ratios are corrected accordingly.

The process depends inter alia on the following points: (a) that in the ordinary way it is difficult or impossible to make a paste containing more starch than water, (b) that it is necessary to heat above the gelatinisation temperature and that this temperature is usually higher than the temperature at which enzymes are rapidly destroyed. (c) In spite of this it is found that by progressive local gelatinisation the enzyme does in fact have a sufficiently long life to its work, namely to liquefy sufficient of the gelatinised starch but not necessarily to liquefy it all.

The local gelatinisation occurs mainly at the heating surface whereas liquefaction occurs within the bulk of the mass at temperatures below those at which enzyme is rapidly destroyed.

In a preferred form of the invention a starch paste containing an excess of water is treated with a diastatic malt or other liquefier and further starch is added till the total starch (including that already liquefied) is in excess, e. g. up to 70% of the whole. Although the swelling temperature of starch is much higher than that at which the malt enzymes are rapidly destroyed it is still possible to operate because of the local character of the gelatinisation and immediate liquefaction by the malt at liquefying temperature, 70 to 75° C. The mixture now containing an excess of starch is gelatinised and then cooled to between 60 and 50° and further malt is added, after which malting takes place for several hours at the temperature to give the maximum production of sugar from the dextrinous material produced in the first part of the process.

Instead of using diastatic malt it is possible to use diastatic liquefiers which are more or less resistant to heat, e. g. commercial amylases, superclastase, or degomma, or the like. The process may be performed in open or pressure jacketed pans fitted with clearing stirrer gear (adapted to clear the sides of the vessel by scraping or like action), a starch water diastase slurry being employed.

In the preparation of malt sirup from wheat flour it is necessary to denature the gluten to give workability and a suitably thin product. This is conveniently done by addition of minute amounts of proteolytic enzymes such as papain, superclastase, etc. or by the activation of wheat proteases of the wheat flour by glutathione or cysteine hydrochloride.

The starch is partly liquefied by heating in the presence of amylases, then swollen and a final quantity of malt added at 60/50° C. as in ordinary starch conversion. Denaturing of the wheat gluten may be partially accomplished by extra heavy chemical or other treatment, during milling.

*Example I*

4 cwt. of water is placed in a batch converter fitted with clearing stirring gear, jacket and open steam, and 10 cwt. of tapioca starch added gradually over ¼ to ½ hour. When, say, 2 cwt. starch has been added, the heating by jacket having been continuous, 20 lbs. 300° L. malt sirup is introduced and a further 10 lbs. of this sirup later if necessary to control fluidity. Mixing and heating at about 75–85° C. is continued for ¼ hour until smooth, and open steam applied until the starch is cooked (½ hour) at about 90–95° C. Cooling is effected by jacket cooling or by transferring to another container and at 60/50° C., 30 to 60 lbs. 300° L. malt sirup is further added and allowed to act for three hours or more by retention of this temperature.

Instead of the initial malt used for liquefaction, 6 ozs. of Superclastase can be used.

Example II

For wheat flour malting, protease material e. g. 12 ozs. Superclastase is added and boiling carried out in this case without the addition of malt for liquefaction as such proteolytic enzymes serve the dual purpose of gluten and starch liquefier. The boiled liquid wheat flour in Example I, but using 4½ cwt. of water, is malted as with ordinary starch (above). The use of papain etc. would require the after addition of a starch liquefier as in Example I. The product is a mild flavoured easy flowing sirup of 63% strength, starch sirups being somewhat higher (70%; 87% conv.) both being applicable to sugar and flour confectionery manufacture and for domestic use.

It will be seen that in the examples direct production of a high strength sirup is possible, in view of the re-availability of the water, the dilution and segregative function of the unchanged starch, and the cumulative lubrication by liquefied hydrolysed starch.

I declare that what I claim is:

1. The process of producing a sweet sirup which consists in adding at least 1⅓ parts by weight of farinaceous material in stages to 1 part of water, at the same time gelatinising the starch by heat and liquefying sufficient of the gelatinised starch by amylase so that the mass is reduced to a sirupy consistency, and then converting the mass at a lower temperature by action of added sugar-forming amylase to a concentrated sweet sugar sirup without a separate evaporation process.

2. A process as in claim 1 in which starch is used as the farinaceous material.

3. A process as in claim 1 in which wheat flour is used as the farinaceous material.

4. Process as in claim 1 in which the sweet sirup contains over 50% of a mixture of reducing sugar and dextrin.

5. Process as claimed in claim 1 in which the sweet sirup contains over 60% of a mixture of reducing sugar and dextrin.

6. A process as claimed in claim 1 in which amylase derived from material selected from the group consisting of grain malt and soya beans, is used for the second or sugar-producing part of the process.

7. A process as claimed in claim 1 in which starch is treated and amylases derived from malted seeds are used for liquefying and sugar-forming.

8. A process as claimed in claim 1 in which wheat flour is treated and an enzymic mixture is used capable of liquefying both gluten and starch in the first stage of the process.

9. The process of producing a sirupy concentrate of liquefied starch which consists in gradually adding at least two parts by weight of farinaceous material to one part of water and progressively gelatinising and liquefying the starch by heat and the action of amylase.

CHRISTOPHER HENRY WARBURTON.